W. H. MORROW.
PLUMB LEVEL.
APPLICATION FILED MAR. 28, 1914.
1,236,743.
Patented Aug. 14, 1917.
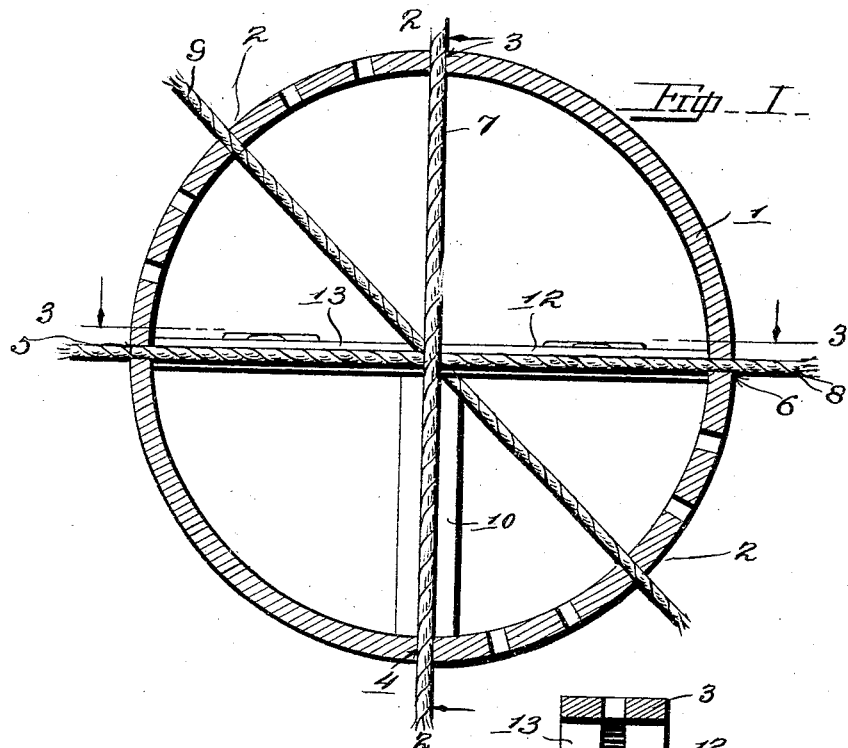
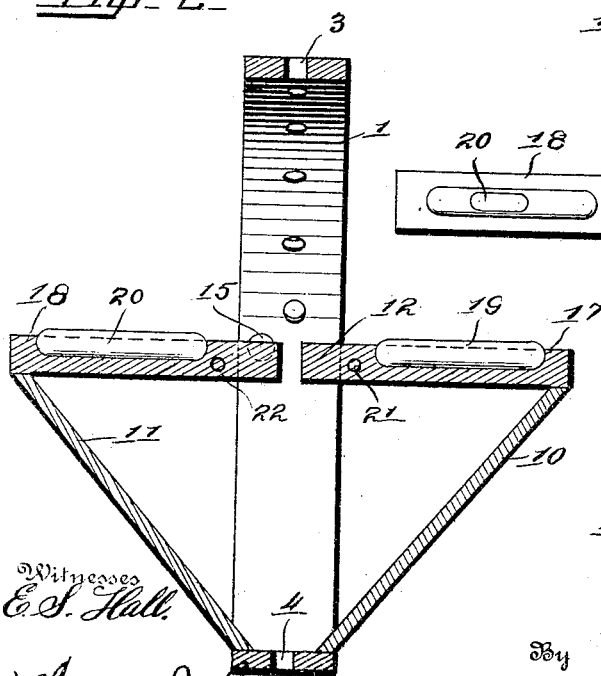
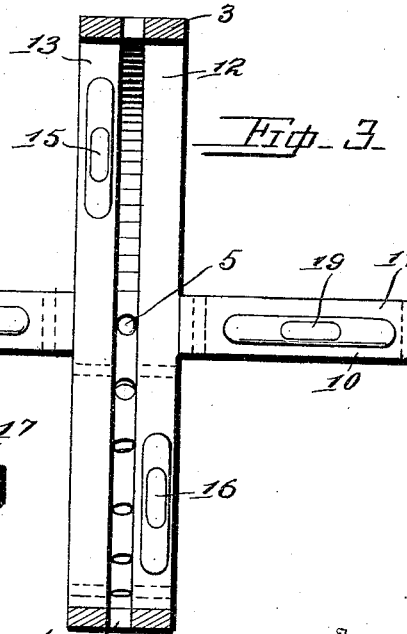
Inventor
William H. Morrow.

UNITED STATES PATENT OFFICE.

WILLIAM H. MORROW, OF MILAN, MISSOURI.

PLUMB-LEVEL.

1,236,743.   Specification of Letters Patent.   Patented Aug. 14, 1917.

Application filed March 28, 1914. Serial No. 827,981.

*To all whom it may concern:*

Be it known that I, WILLIAM H. MORROW, a citizen of the United States, residing at Milan, in the county of Sullivan and State of Missouri, have invented certain new and useful Improvements in Plumb-Levels, of which the following is a specification.

This invention relates to plumb-levels and has for an object to provide a device of this character embodying means for taking measurements at various angles to the axes of the device.

Another object consists in the provision of a device which can be used equally well by carpenters, masons, plumbers, etc., and which has means provided for determining the level and plumb of an object in one operation.

A further object of this invention is to provide a plumb level which may be used to advantage in connection with a straight edge and which has spirit levels attached thereto whereby the operator may determine the level of the device when taking the horizontal or perpendicular measurements of an object.

Other objects as well as the nature, characteristic features and scope of my invention will be more readily understood from the following description, taken in connection with the accompanying drawings and pointed out in the claims forming a part of this specification, wherein—

Figure 1 is a circumferential sectional view taken through the frame of my device and showing the manner in which the various lines are associated.

Fig. 2 is a sectional view taken on line 2—2 of Fig. 1, and,

Fig. 3 is a horizontal sectional view taken on line 3—3 of Fig. 1.

As illustrated in the drawings, the invention comprises a circular frame 1 which has its outer periphery graduated into the degrees of a circle, certain of which degrees are represented by the openings 2. These openings are apportioned off into two diametrically opposite groups as shown, the uppermost opening 3 of one group alining vertically with the lowermost opening 4 of the opposite group; both of these openings being arranged co-incident with the vertical axis of the frame 1, which in this invention is represented by the plumb line 7. Openings 5 and 6 are adapted to aline with each other upon a horizontal plane and permit the passing of a level line 8 through the frame at right angles to the plumb line 7. This line 8 constitutes the horizontal axis of the invention and is used for determining the level or horizontal measurements of an object.

An auxiliary line 9 is employed to assist the operator in taking angles of various degrees from the plumb line 7 or level line 8 and is termed the angle line of the invention.

The number of degrees marked between the openings 3 and 5 are arranged to correspond with those degrees designated between openings 4 and 6 and any angle may be found by simply passing the line 9 through those openings which represent the desired number of degrees in that angle. In such an operation it is of course necessary that either the plumb line 7 or the level line 9 be utilized to determine the exact level or plumb upon which to base the angular measurements.

Members 10 and 11 are secured to the lower portion of the frame 1 and project upwardly and outwardly therefrom to provide supports for the arms 17 and 18 of the respective cross pieces 12 and 13. These cross pieces are positioned within the frame of each side of the openings 5 and 6, extending parallel with the line 8, and carrying spirit levels 15 and 16, which assist the operator in maintaining the level of the line 8 when determining horizontal measurements. The arms 17 and 18 extend at right angles from the center of the frame and are provided with the spirit levels 19 and 20 respectively. The levels are thus disposed radially about the lines 7—8—9 and coöperate in determining the exact plumb or level of a desired object, since it is necessary that each of the four spirit bubbles register an exact level of the frame before it can be assumed that the line 7 is perpendicular or plumb.

In using my device on a straight edge as a plumb rule, for plumbing window frames, etc., screws or other fastening means are inserted through openings 22, formed in the support 11 and arm 12.

Openings 21 are provided upon the opposite side of the frame for a similar purpose but it is to be understood that such openings may be placed wherever it may be convenient for the attachment thereto of a straight edge.

In the operation of this invention, the frame 1 is slidably mounted upon the plumb line 7, the circumference of the opening 3 and 4 however being sufficient to afford a frictional contact with the line, so that the frame may be supported in any adjusted position. In using the device one end of the line 7 is attached to a suitable support and the other end is extended and adjusted either to the right or left until the spirit bubbles indicate the line 7 is plumb. To determine the horizontal measurements or level of anything the line 8 is extended in opposite directions from the frame and the levels 15 and 16 notify the operator when the line is level. After the plumb or level of the frame has been determined any angle may be formed by passing the line 9 through the opening designating the required degrees as before described.

It will be understood that the above description and accompanying drawings comprehend only the general and preferred embodiment of my invention and that various minor changes in the details of construction proportion and arrangement of parts may be made within the scope of the appended claims and without sacrificing any of the advantages of my invention.

Having thus fully described my invention what I claim and desire to secure by Letters Patent is:—

1. A plumb level including a frame provided with diametrically opposed series of openings which are arranged in alined pairs certain of which pairs are positioned coincident with the vertical and horizontal axes respectively of the frame, means arranged through said certain alined pairs of openings to designate the said axes of the frame, the remaining pairs of alined openings being positioned between said certain alined pairs to denote predetermined degrees of a circle, and means mountable in any of said remaining pairs of alined openings for co-action with said first means to obtain accurate measurements at angles to the axes of said frame.

2. A plumb level including a frame provided with diametrically opposed series of openings which are arranged in alined pairs certain of which are positioned co-incident with the vertical and horizontal axes respectively, of the frame, means arranged through said certain alined pairs of openings to designate the said axes of the frame, the remaining pairs of alined openings being positioned between said certain alined pairs to denote predetermined degrees of a circle, means mountable in any of said remaining pairs of alined openings for co-action with said first means to obtain accurate measurements at angles to the axes of said frame, and visible means carried by said frame whereby the plumb and level of the device may be ascertained.

3. A plumb level including a plumb line, a circular frame slidably mounted upon said plumb line and provided with vertically and horizontally alined pairs of openings respectively arranged co-incident to the axes of the frame, said plumb line being adapted to pass through said vertically alined pair of openings and representing the vertical axis of said frame, a level line carried by said frame for horizontal measurements and adapted to pass through the horizontally alined pair of openings, and spirit levels disposed upon said frame and in parallel relation to said level line.

4. A plumb level including a circular frame having vertically and horizontally alined pairs of openings provided therein, co-incident respectively to the vertical and horizontal axes of said frame, a plumb line arranged through said vertically alined pair of openings to designate the vertical axis of the frame, a level line arranged through the horizontally alined pair of openings to designate the horizontal axis of the frame, spirit levels carried by the frame in parallel relation to said level line, a plurality of other alined pairs of openings provided in said frame and means arranged to pass transversely of the center of said frame and through any of said other alined pairs of openings, to determine measurements at angles to said plumb and level lines.

5. The combination with a plumb line of a frame member mounted upon said line and having openings formed therein to permit the passage of various lines therethrough transversely to said plumb line, and a plurality of spirit levels secured to said frame and arranged in substantially radial position relative to said plumb-line.

6. A plumb level including a circular frame pierced circumferentially with openings denoting predetermined degrees of a circle and arranged in alined pairs, certain of said alined pairs of openings positioned to accommodate means passing through said frame at right angles to each other and designating, respectively, the vertical and horizontal axes of said frame, spaced level-bearing cross pieces carried by said frame and arranged parallel with the horizontal axis thereof for determining the level of the frame, and means mountable in any of the alined pairs of openings intervening between said vertical and horizontal axes and co-acting with said first means to obtain measurements at angles to the said axes of the frame.

7. A plumb level including a circular frame pierced circumferentially with openings designating pre-determined degrees of a circle and arranged in alined pairs, certain of said alined pairs of openings positioned to accommodate means passing through said frame at right angles to each other and designating respectively the vertical and horizontal axes of the frame, spaced cross pieces arranged within the frame in alinement with the horizontal axis thereof, laterally extending arms formed on said cross pieces, supports for said arms carried by said frame, spirit levels disposed upon each of said cross pieces and arms for determining the exact level of said frame, and means mountable in any of the alined pairs of openings intervening between said vertical and horizontal axes and co-acting with said first means to obtain measurements at angles to the said axes of the frame.

In testimony whereof I affix my signature in presence of two witnesses.

WILLIAM H. MORROW.

Witnesses:
 E. M. GIRDNER,
 C. F. EUBANKS.

Copies of this patent may be obtained for five cents each, by addressing the "Commissioner of Patents, Washington, D. C."